US008542600B2

(12) United States Patent
Kawabata et al.

(10) Patent No.: US 8,542,600 B2
(45) Date of Patent: Sep. 24, 2013

(54) IMAGE COMMUNICATING APPARATUS

(75) Inventors: Hirotaka Kawabata, Saitama (JP);
Tatsuyuki Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 675 days.

(21) Appl. No.: 12/766,563

(22) Filed: Apr. 23, 2010

(65) Prior Publication Data
US 2011/0080837 A1    Apr. 7, 2011

(30) Foreign Application Priority Data
Oct. 2, 2009    (JP) .................................. 2009-230561

(51) Int. Cl.
*G06F 11/00* (2006.01)
*G01R 31/07* (2006.01)
*G06F 3/12* (2006.01)

(52) U.S. Cl.
USPC ..... 370/242; 370/252; 370/395.52; 358/1.15; 358/426.09

(58) Field of Classification Search
USPC ................. 370/229, 235, 236, 242, 282, 384, 370/395.52, 252; 714/748–749; 358/425, 358/426.09, 442, 1.15
See application file for complete search history.

(56) References Cited

U.S. PATENT DOCUMENTS

| | | | | |
|---|---|---|---|---|
| 6,438,105 | B1 * | 8/2002 | Qarni et al. | 370/231 |
| 2003/0063324 | A1 * | 4/2003 | Takaoka | 358/404 |
| 2004/0184110 | A1 * | 9/2004 | Maei et al. | 358/400 |
| 2005/0057781 | A1 | 3/2005 | Kajiwara | |
| 2008/0094661 | A1 * | 4/2008 | Lee et al. | 358/1.15 |
| 2010/0033756 | A1 * | 2/2010 | Fujioka | 358/1.15 |

FOREIGN PATENT DOCUMENTS

| | | |
|---|---|---|
| JP | A-2-192262 | 7/1990 |
| JP | A-10-107987 | 4/1998 |
| JP | A-2000-341252 | 12/2000 |
| JP | A-2001-119429 | 4/2001 |
| JP | A-2001-251465 | 9/2001 |
| JP | A-2005-094213 | 4/2005 |
| JP | A-2005-260624 | 9/2005 |
| JP | A-2008-227978 | 9/2008 |

OTHER PUBLICATIONS

Mar. 19, 2013 Office Action issued in Japanese Application No. 2009-230561 (with English Translation).

* cited by examiner

*Primary Examiner* — Habte Mered
(74) *Attorney, Agent, or Firm* — Oliff & Berridge, PLC

(57) ABSTRACT

An image communicating apparatus includes a packet control portion that transmits/receives an IFP packet by a T.38 communicating function, and an image communicating control portion. The packet control portion includes a counting unit that counts a total number of received packets and a number of loss packets in the IFP packet. The image communicating control portion includes a calculating unit that calculates a loss ratio of the IFP packet from a rate of the number of loss packets to the total number of received packets which is counted by the counting unit in a receipt of a post message; and a response signal returning unit that returns a retraining negative signal to an apparatus on a transmitting side for the image information in response to the post message, and returns a message confirming signal to the apparatus on the transmitting side in response to the post message.

13 Claims, 11 Drawing Sheets

IMAGE COMMUNICATING APPARATUS

The present application claims priority from Japanese Patent Application No. 2009-230561 filed on Oct. 2, 2009, the entire content of which is incorporated herein by reference.

BACKGROUND OF INVENTION

1. Field of the Invention

The present invention relates to an image communicating apparatus.

2. Description of the Related Art

In a facsimile communication, in the case in which the number of dots between EOL (End of line) codes added to an end of a transmission line at a receiver side is not coincident with the number of dots which is determined by T.4 recommended in ITU-T to be a telecommunication standardization sector of ITU (International Telecommunication Union), a decision of a transmission error line is made.

More specifically, received image information is composite and the number of dots between the EOL codes is then counted on the receiver side. If the number of transmission lines in which the count value is not coincident with the number of dots determined by the T.4 exceeds a preset threshold, an RTP signal (a retraining positive signal) or an RTN (a retraining negative signal) is transmitted as a transmission line error to a transmitter side.

The RTP signal indicates that a message (image information) is completely received, and furthermore, represents that a subsequent message communication may be continued after a transmission/receipt of a training or synchronizing signal and a CFR signal (a receiving standard confirming signal).

Moreover, the RTN signal indicates that the message is not completely received but the subsequent message can be received if the training or synchronizing signal is retransmitted.

According to the technique, even if data to be transmitted are lost or a data change is caused due to a short break of a power supply or a noise, thus, it is detected as a deviation of the number of dots between the EOLs. Consequently, it is possible to reliably detect the transmission line error on a receiver side.

Even if the data loss or data change is caused continuously for a certain period so that data corresponding to several lines cannot be received normally, moreover, a probability that start and end parts of a data abnormality will be exactly applied to a break of the line is low on a probability theory basis. Also in this case, therefore, it is possible to make a detection of at least an error of one or two lines in front and rear parts.

In a facsimile communication using an IP (Internet Protocol) network having a T.38 method recommended in the ITU-T, a method of packeting data every line or several lines and transferring the packet in a non-ECM (Error Correction Mode) communication is a mainstream.

In the packet transferring method, data are lost or cancelled on a packet unit over the IP network in many cases. If the packet is lost during a receipt of image information, data are clearly missing exactly in a break of a line. Even if the data are lost, therefore, it is impossible to carry out counting as a transmission error line in the method.

As a result, there is a possibility that "normal end" might be obtained as a result of the receipt and a lack caused in an information transfer between users cannot be recognized, resulting in troubles even if a received image has a lack and is thus short.

SUMMARY OF INVENTION

According to an aspect of the invention, an image communicating apparatus includes:

a packet control portion that transmits/receives an IFP packet by a T.38 communicating function; and an image communicating control portion that describes a T.30 command and image information in a field of the IFP packet to control an image communication, the packet control portion including:
a counting unit that counts a total number of received packets and a number of loss packets in the IFP packet in a receipt of the image information, and the image communicating control portion including:
a calculating unit that calculates a loss ratio of the IFP packet in the receipt of the image information from a rate of the number of loss packets to the total number of received packets which is counted by the counting unit in a receipt of a post message; and a response signal returning unit that returns a retraining negative signal to an apparatus on a transmitting side for the image information in response to the post message if the loss ratio calculated by the calculating unit exceeds a first threshold, and returns a message confirming signal to the apparatus on the transmitting side in response to the post message if the loss ratio calculated by the calculating unit is equal to or smaller than the first threshold.

BRIEF DESCRIPTION OF THE DRAWINGS

Exemplary embodiments of the invention will be described in detail based on the following figures, wherein.

DESCRIPTION OF EXEMPLARY EMBODIMENTS

An example according to the invention will be described below in detail with reference to the accompanying drawings.

Figure 1:
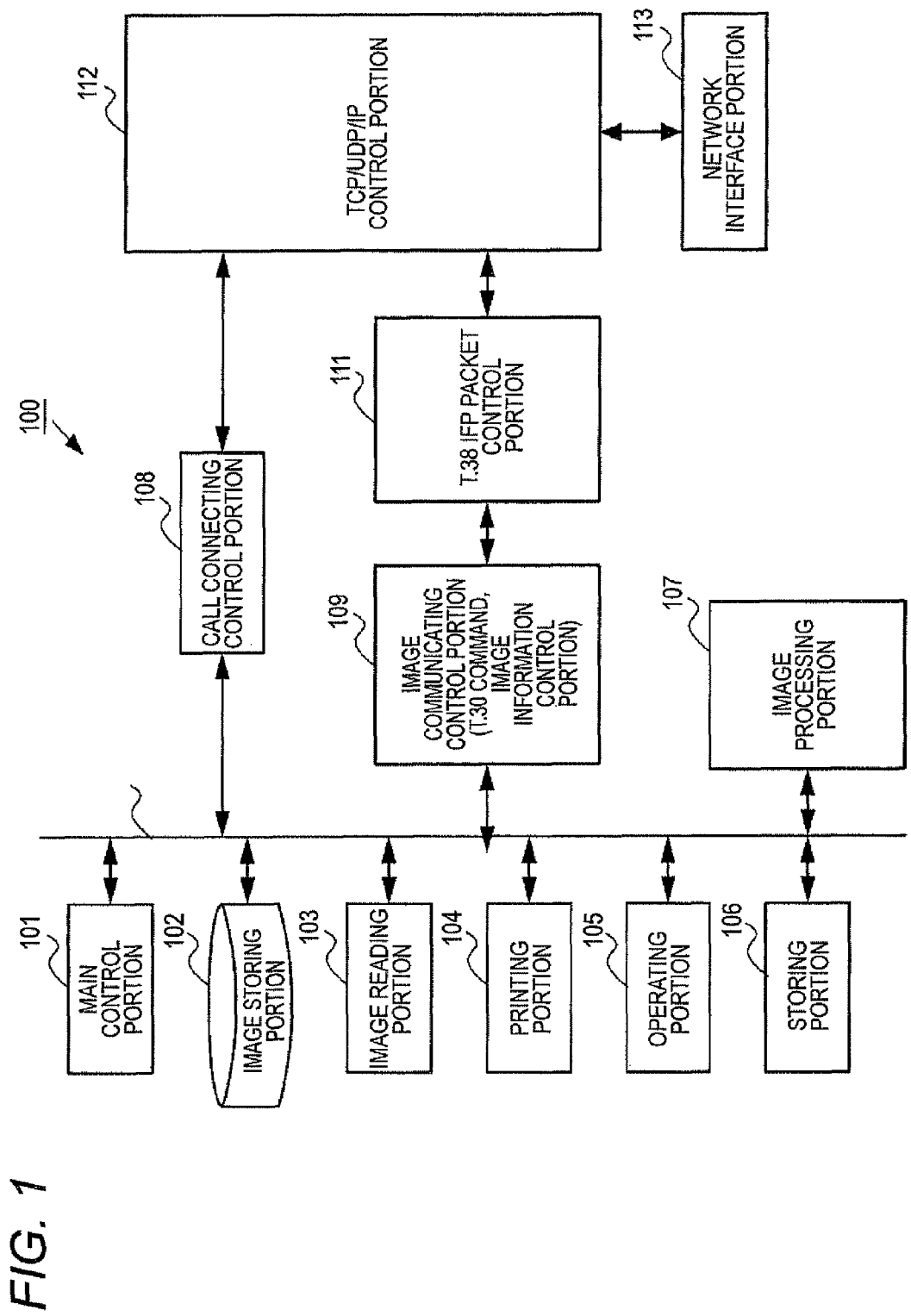
FIG. 1 is a block diagram showing a schematic structure of an image communicating apparatus according to the invention.

FIG. 1 is a block diagram showing a schematic structure of an image communicating apparatus according to the invention. An image communicating apparatus 100 has a structure in which a main control portion 101, an image storing portion 102, an image reading portion 103, a printing portion 104, an operating portion 105, a storing portion 106, an image processing portion 107, a call connecting control portion 108 and an image communicating control portion 109 are connected to a bus 110 and the call connecting control portion 108 is connected to a network interface portion 113 through a TCP/UDP/IP control portion 112, and furthermore, the image communicating control portion 109 is connected to the TCP/UDP/IP control portion 112 through a T.38 IFP (Internet Facsimile Protocol) packet control portion 111.

The main control portion 101 carries out a control processing for the whole image communicating apparatus 100.

The image storing portion 102 stores an image read through the image reading portion 103 or a received image.

The image reading portion 103 reads an original image in a predetermined resolution and the printing portion 104 prints the image in a predetermined resolution.

The operating portion 105 has a display portion for displaying various operating keys for operating the image communicating apparatus 100 and various information.

The storing portion 106 is constituted by an RAM (Random Access Memory) and stores system data for controlling an operation of the image communicating apparatus 100 and information about a communication.

The image processing portion 107 carries out processings such as coding, decoding, enlargement and reduction for image data.

The call connecting control portion 108 controls a call connection through SIP. A specific example of a control function offered by the SIP includes registration of information about a position, establishment and disconnection of a session, negotiation of a capability and exchange of information about a presence.

The image communicating control portion 109 implements an image communication and controls an ITU (International Telecommunication Union)-T.30 protocol.

The T-38 IFP packet control portion 111 controls a protocol of an IFP packet layer in accordance with ITU-T.38, and controls a transmission/receipt of an IFP packet through a T.38 communicating function.

The TCP/UDP/IP control portion 112 carries out a protocol control of a transport/network layer of internet. The network interface portion 113 is connected to an IP network and controls a communication of a data link layer and succeeding layers.

First Example

Figure 2:
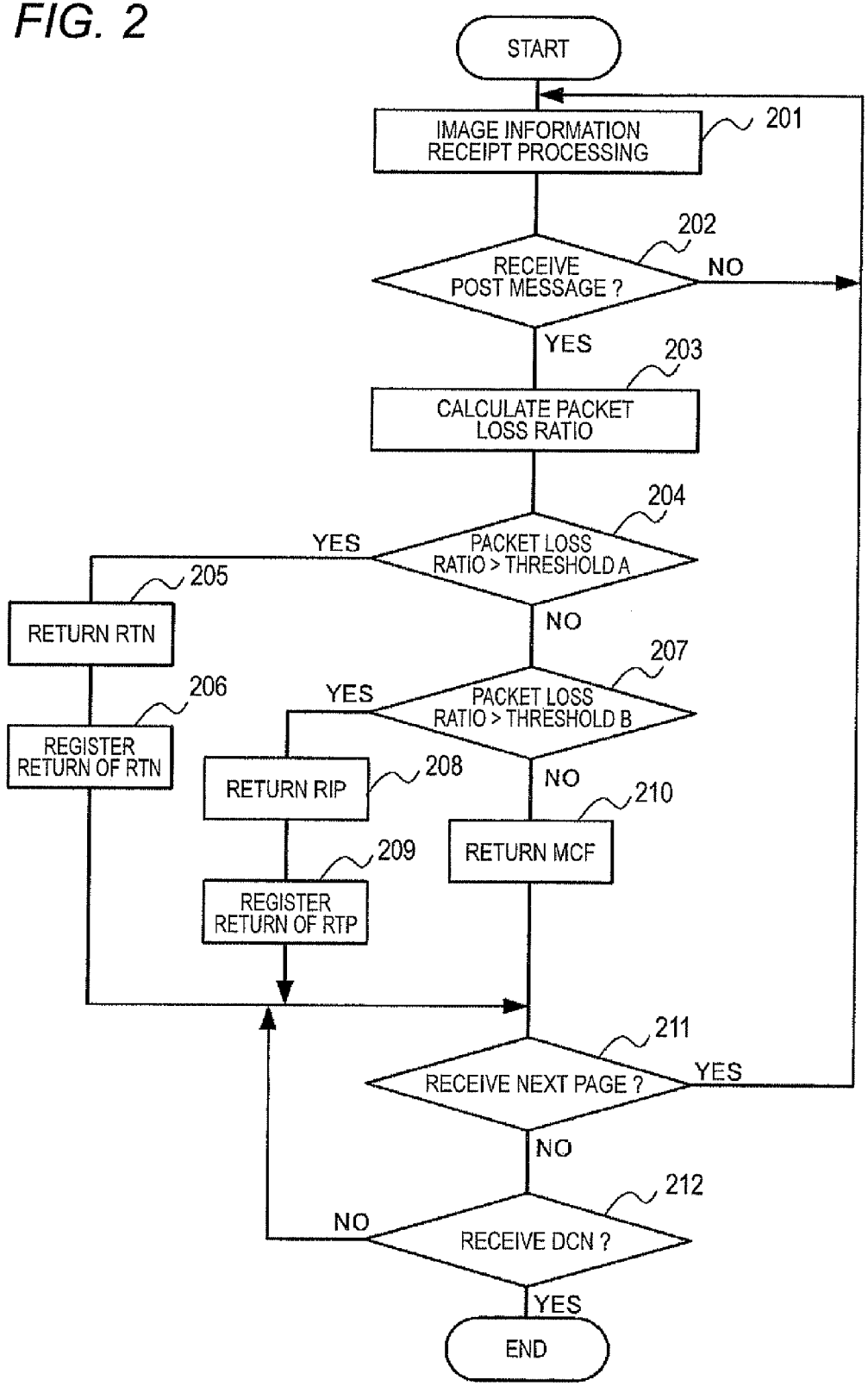
FIG. 2 is a flowchart showing an operation of an image communicating control portion illustrated in FIG. 1 according to a first example of the invention.

FIG. 2 is a flowchart showing an operation of the image communicating control portion illustrated in FIG. 1 according to a first example of the invention.

In the first example, the T.38 IFP packet control portion 111 in FIG. 1 has a counting function for counting a total number of received packets and a total number of loss packets in an IFP packet in a receipt of image information.

Moreover, the image communicating control portion 109 acquires the total number of received packets and the total number of loss packets in the receipt of image information from the T.38 IFP packet control portion 111 through a receipt of a post message indicative of an image information receiving end. Then, The image communicating control portion 109 calculates a packet loss ratio in the receipt of the image information from a rate of the total number of loss packets to the total number of received packets, and switches an MCF signal (a message confirming signal), an RTP signal (a retraining positive signal) and an RTN signal (a retraining negative signal) and returns them to an apparatus on a transmitting side in response to the post message depending on the packet loss ratio.

More specifically, the image communicating control portion 109 presets two thresholds of a threshold A>a threshold B corresponding to the packet loss ratio, returns the RTN signal to the apparatus on the transmitting side in response to the post message if the packet loss ratio exceeds the threshold A, returns the RTP signal to the apparatus on the transmitting side in response to the post message if the packet loss ratio is equal to or smaller than the threshold A and exceeds the threshold B, and returns the MCF signal to the apparatus on the transmitting side in response to the post message if the packet loss ratio is equal to or smaller than the threshold B.

When a processing of the flowchart in FIG. 2 is started, it is checked whether a post message indicating an end of an image receipt processing (Step 201) is received or not (Step 202). If the post message is not received (NO in the Step S202), the processing returns to the Step 201 and the image receipt processing is continued to wait for the receipt of the post message. If it is decided that the post message is received (YES in the Step 202), a packet loss ratio is calculated (Step 203).

Referring to the calculation of the packet loss ratio in the Step 203, a total number of received packets Nj and a total number of loss packets Ne in the receipt of image information are acquired from the T.38 IFP packet control portion 111, and a packet loss ratio Pe is obtained through a calculation based on the following equation.

$$\text{Total number of loss packets } Ne/\text{total number of received packets } Nj = \text{packet loss ratio } Pe$$

Next, it is checked whether the packet loss ratio Pe calculated as described above exceeds the threshold A or not, that is, Pe>A is formed or not (Step 204). When the packet loss ratio Pe exceeds the threshold A (YES in the Step 204), the RTN signal indicating that the image information is not completely received but subsequent image information can be received if a training or synchronizing signal is retransmitted is returned to the apparatus on the transmitting side in response to the post message (Step 205) and the return of the RTN signal is registered as log information in the storing portion 106 (Step 206), and the processing proceeds to Step 211.

If it is decided that the packet loss ratio Pe is equal to or smaller than the threshold A at the Step 204 (NO in the Step 204), moreover, it is then checked whether the packet loss ratio Pe exceeds the threshold B or not, that is, Pe>B is formed or not (Step 207). If the packet loss ratio Pe exceeds the threshold B (YES in the Step 207), the RTP signal representing that the image information is completely received and a communication of a subsequent message may further be continued after a transfer of the training or synchronizing signal and a CFR signal is returned to the apparatus on the transmitting side in response to the post message (Step 208), and the return of the RTP signal is registered as log information in the storing portion 106 (Step 209) and the processing proceeds to the Step 211.

If it is decided that the packet loss ratio Pe is equal to or smaller than the threshold B at the Step 207 (NO in the Step 207), furthermore, the MCF signal indicating that the image information is completely received is returned to the apparatus on the transmitting side in response to the post message (Step 210) and the processing proceeds to the Step 211.

At the Step 211, it is checked whether image information of a next page is received or not. If the image information of the next page is received (YES in the Step 211), the processing returns to the Step 201 and the processing for receiving the image information of the next page is executed, and the processing from the Step 201 to the Step 211 is repeated.

If it is decided that the image information of the next page is not received at the Step 211 (NO in the Step 211), moreover, it is then checked whether a DCN signal (disconnect signal) is received or not (Step 212). If it is decided that the DCN signal is not received (NO in the Step 211), the processing returns to the Step 211 in which it is checked whether the image information of the next page is received or not again. If it is decided that the DCN signal is received (YES in the Step 212), the processing is ended.

Second Example

In a second example, a threshold C which is greater than the threshold A is further set. If a packet loss ratio exceeds the threshold C, a communication is interrupted and the processing is ended. The other structures are the same as those in the first example.

Figure 3:
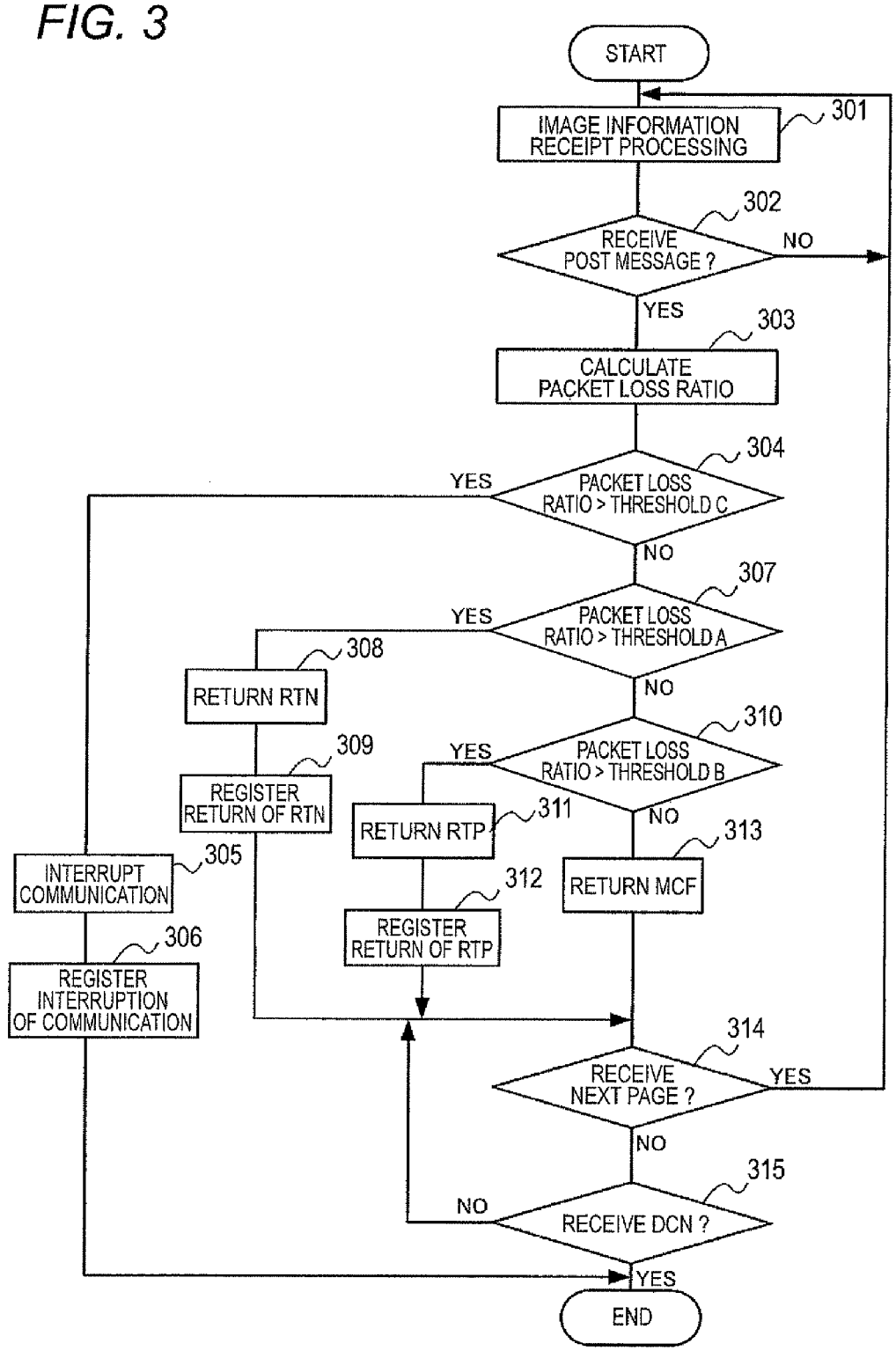
FIG. 3 is a flowchart showing the operation of the image communicating control portion illustrated in FIG. 1 according to a second example of the invention.

FIG. 3 is a flowchart showing an operation of the image communicating control portion illustrated in FIG. 1 according to the second example of the invention.

In the second example, after a packet loss ratio is calculated (Step 303), it is first checked whether the packet loss ratio thus calculated exceeds the threshold C or not (Step 304). If the packet loss ratio exceeds the threshold C (YES in the Step 304), a communication with an apparatus on a transmitting side is interrupted (Step 305) and the interruption of the communication is registered as log information in the storing portion 106 (Step 306). Thus, the processing is ended.

In other words, when a processing of the flowchart shown in FIG. 3 is started, it is checked whether a post message indicating an end of an image receipt processing (Step 301) is received or not (Step 302). If the post message is not received (NO in the Step S302), the processing returns to the Step 301 and the image receipt processing is continued to wait for the receipt of the post message. If it is decided that the post message is received (YES in the Step 302), a total number of received packets Nj and a total number of loss packets Ne in the receipt of image information are acquired from the T.38 IFP packet control portion 111, and a packet loss ratio Pe is thus calculated in the same manner as in the first example (Step 303).

Next, it is checked whether the packet loss ratio Pe thus calculated exceeds the threshold C or not, that is, Pe>C is formed or not (Step 304). If the packet loss ratio Pe exceeds the threshold C (YES in the Step 304), the communication with the apparatus on the transmitting side is interrupted (Step 305) and the interruption of the communication is registered as log information in the storing portion 106 (Step 306). Thus, the processing is ended.

If it is decided that the packet loss ratio Pe is equal to or smaller than the threshold C at the Step 304 (NO in the Step 304), moreover, it is then checked whether the calculated packet loss ratio Pe exceeds the threshold A or not (Step 307). If the packet loss ratio Pe exceeds the threshold A (YES in the Step 307), an RTN signal is returned to the apparatus on the transmitting side in response to the post message (Step 308) and the return of the RTN signal is registered as log information in the storing portion 106 (Step 309), and the processing proceeds to Step 314.

If it is decided that the packet loss ratio Pe is equal to or smaller than the threshold A at the Step 307 (NO in the Step 307), moreover, it is then checked whether the packet loss ratio Pe exceeds a threshold B or not (Step 310). If the packet loss ratio Pe exceeds the threshold B (YES in the Step 310), an RTP signal is returned to the apparatus on the transmitting side in response to the post message (Step 311) and the return of the RTP signal is registered as log information in the storing portion 106 (Step 312), and the processing proceeds to the Step 314.

If it is decided that the packet loss ratio Pe is equal to or smaller than the threshold B at the Step 310 (NO in the Step 310), moreover, an MCF signal is returned to the apparatus on the transmitting side in response to the post message (Step 313) and the processing proceeds to the Step 314.

At the Step 314, it is checked whether image information of a next page is received or not. If the image information of the next page is received (YES in the Step 314), the processing returns to the Step 301 and the processing for receiving the image information of the next page is executed, and the processing from the Step 301 to the Step 314 is repeated.

If it is decided that the image information of the next page is not received at the Step 314 (NO in the Step 314), furthermore, it is then checked whether a DCN signal is received or not (Step 315). If it is decided that the DCN signal is not received (NO in the Step 315), the processing returns to the Step 314 and it is checked whether the image information of the next page is received or not again. If it is decided that the DCN signal is received (YES in the Step 314), the processing is ended.

Third Example

In a third example, the T.38 IFP packet control portion 111 in FIG. 1 counts a maximum number of continuous loss packets, that is, a maximum value of a number of continuous loss packets. The image communicating control portion 109 presets two thresholds of a threshold "a">a threshold "b" corresponding to the maximum number of continuous loss packets, returns an RTN signal to an apparatus on a transmitting side in response to a post message if the maximum number of continuous loss packets exceeds the threshold "a", returns an RTP signal to the apparatus on the transmitting side in response to the post message if the maximum number of continuous loss packets is equal to or smaller than the threshold "a" and exceeds the threshold "b", and returns an MCF signal to the apparatus on the transmitting side in response to the post message if the maximum number of continuous loss packets is equal to or smaller than the threshold "b".

Figure 4:
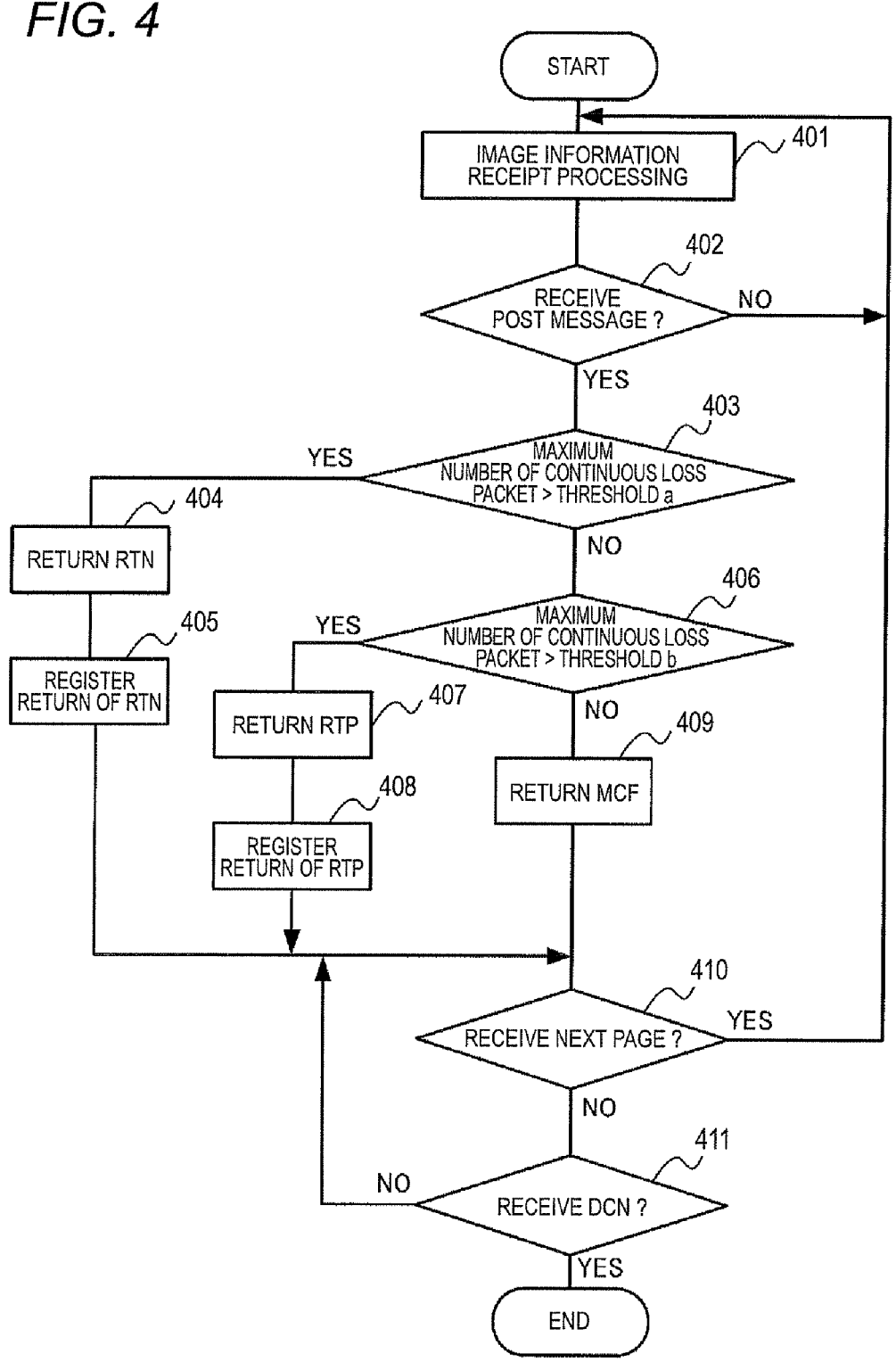
FIG. 4 is a flowchart showing the operation of the image communicating control portion illustrated in FIG. 1 according to a third example of the invention.

FIG. 4 is a flowchart showing an operation of the image communicating control portion illustrated in FIG. 1 according to the third example of the invention.

When a processing of the flowchart in FIG. 4 is started, it is checked whether a post message indicating an end of an image receipt processing (Step 401) is received or not (Step 402). If the post message is not received (NO in the Step S402), the processing returns to the Step 401 and the image receipt processing is continued to wait for the receipt of the post message. If it is decided that the post message is received (YES in the Step 402), the maximum number of continuous loss packets is acquired from the T.38 IFP packet control portion 111 and it is decided whether the maximum number of continuous loss packets MNe exceeds the threshold "a" or not, that is, MNe>a is formed or not (Step 403). If the maximum number of continuous loss packets MNe exceeds the threshold "a" (YES in the Step 403), the RTN signal is returned to the apparatus on the transmitting side in response to the post message (Step 404) and the return of the RTN signal is registered as log information in the storing portion 106 (Step 405), and the processing proceeds to Step 410.

If it is decided that the maximum number of continuous loss packets MNe is equal to or smaller than the threshold "a" at the Step 403 (NO in the Step 403), moreover, it is then checked whether the maximum number of continuous loss packets MNe exceeds the threshold "b" or not, that is, MNe>b is formed or not (Step 406). If the maximum number of continuous loss packets MNe exceeds the threshold "b" (YES in the Step 406), the RTP signal is returned to the apparatus on the transmitting side in response to the post message (Step 407), and the return of the RTP signal is registered as log information in the storing portion 106 (Step 408) and the processing proceeds to the Step 410.

If it is decided that the maximum number of continuous loss packets MNe is equal to or smaller than the threshold "b" at the Step 406 (NO in the Step 406), furthermore, the MCF signal is returned to the apparatus on the transmitting side in response to the post message (Step 409) and the processing proceeds to the Step 410.

At the Step 410, it is checked whether image information of a next page is received or not. If the image information of the next page is received (YES in the Step 410), the processing returns to the Step 401 and the processing for receiving the image information of the next page is executed, and the processing from the Step 401 to the Step 410 is repeated.

If it is decided that the image information of the next page is not received at the Step 410 (NO in the Step 410), moreover, it is then checked whether a DCN signal is received or not (Step 411). If it is decided that the DCN signal is not received (NO in the Step 411), the processing returns to the Step 410 in which it is checked whether the image information of the next page is received or not again. If it is decided that the DCN signal is received (YES in the Step 411), the processing is ended.

Fourth Example

In a fourth example, the T.38 IFP packet control portion 111 in FIG. 1 counts a total number of received packets, a total number of loss packets and a maximum number of continuous loss packets in a receipt of image information. The image communicating control portion 109 presets three thresholds of a threshold C>a threshold A>a threshold B corresponding to a packet loss ratio, and furthermore, presets two thresholds of a threshold "a">a threshold "b" corresponding to the maximum number of continuous loss packets, and interrupts a communication when the packet loss ratio exceeds the threshold C, returns an RTN signal to an apparatus on a transmitting side in response to a post message if the packet loss ratio is equal to or smaller than the threshold C and exceeds the threshold A and if the maximum number of continuous loss packets exceeds the threshold "a", returns an RTP signal to the apparatus on the transmitting side in response to the post message if the packet loss ratio is equal to or smaller than the threshold A and exceeds the threshold B and if the maximum number of continuous loss packets is equal to or smaller than the threshold "a" and exceeds the threshold "b", and returns an MCF signal to the apparatus on the transmitting side in response to the post message if the packet loss ratio is equal to or smaller than the threshold B and the maximum number of continuous loss packets is equal to or smaller than the threshold "b".

Figure 5:
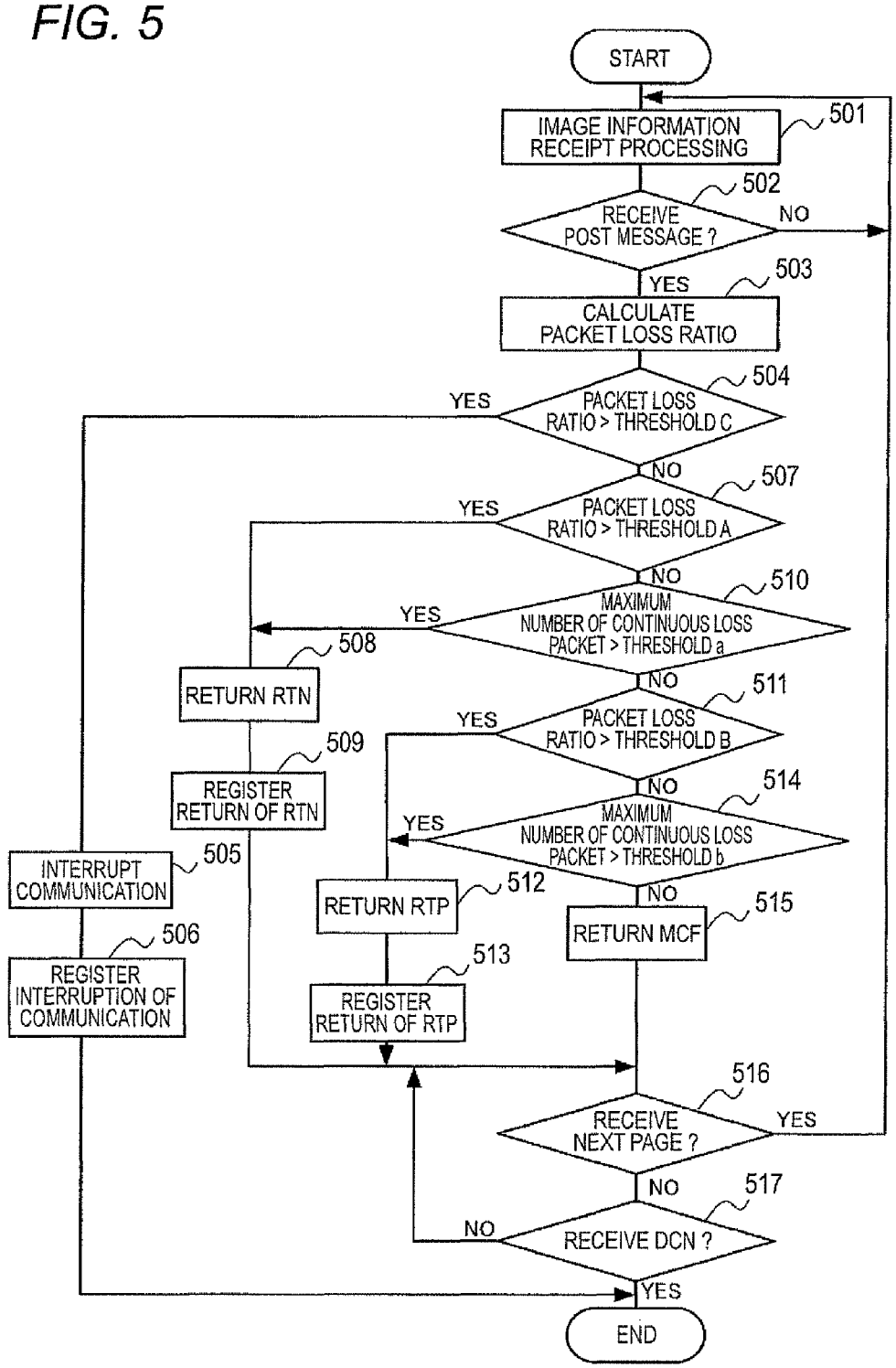
FIG. 5 is a flowchart showing the operation of the image communicating control portion illustrated in FIG. 1 according to a fourth example of the invention.

FIG. 5 is a flowchart showing an operation of the image communicating control portion illustrated in FIG. 1 according to the fourth example of the invention.

When a processing of the flowchart shown in FIG. 5 is started, it is checked whether a post message indicating an end of an image receipt processing (Step 501) is received or not (Step 502). If the post message is not received (NO in the Step S502), the processing returns to the Step 501 and the image receipt processing is continued to wait for the receipt of the post message. If it is decided that the post message is received (YES in Step 502), a total number of received packets Nj and a total number of loss packets Ne in the receipt of the image information are acquired from the T.38 IFP packet control portion 111 and a packet loss ratio Pe is calculated (Step 503).

Next, it is checked whether the packet loss ratio Pe thus calculated exceeds the threshold C or not (Step 504). If the packet loss ratio Pe exceeds the threshold C (YES in the Step 504), a communication with the apparatus on the transmitting side is interrupted (Step 505) and the interruption of the communication is registered as log information in the storing portion 106 (Step 506), and the processing is ended.

If it is decided that the packet loss ratio Pe is equal to or smaller than the threshold C at the Step 504 (NO in the Step 504), moreover, it is then checked whether the calculated packet loss ratio Pe exceeds the threshold A or not (Step 507). If the packet loss ratio Pe exceeds the threshold A (YES in the Step 507), the processing proceeds to Step 508.

If it is decided that the packet loss ratio Pe is equal to or smaller than the threshold A at the Step 507 (NO in the Step 507), furthermore, the maximum number of continuous loss packets is acquired from the T.38 IFP packet control portion 111 and it is checked whether a maximum number of continuous loss packets MNe exceeds the threshold "a" or not (Step 510). If the maximum number of continuous loss packets MNe exceeds the threshold "a" (YES in the Step 510), the processing proceeds to the Step 508.

The RTN signal is returned to the apparatus on the transmitting side in response to the post message at the Step 508 and the return of the RTN signal is registered as log information in the storing portion 106 (Step 509), and the processing proceeds to Step 516.

If it is decided that the maximum number of continuous loss packets MNe is equal to or smaller than the threshold "a" at the Step 510 (NO in the Step 510), moreover, it is checked whether the packet loss ratio Pe exceeds the threshold B or not (Step 511). If the packet loss ratio Pe exceeds the threshold B (YES in the Step 511), the processing proceeds to Step 512.

If it is decided that the packet loss ratio Pe is equal to or smaller than the threshold B at the Step 511 (NO in the Step 511), furthermore, it is checked whether the maximum number of continuous loss packets MNe exceeds the threshold "b" or not, that is, MNe>b is formed or not (Step 514). If the maximum number of continuous loss packets MNe exceeds the threshold "b" (YES in the Step 514), the processing proceeds to the Step 512.

The RTP signal is returned to the apparatus on the transmitting side in response to the post message at the Step 512 and the return of the RTP signal is registered as log information in the storing portion 106 (Step 513), and the processing proceeds to Step 516.

If it is decided that the maximum number of continuous loss packets MNe is equal to or smaller than the threshold "b" at the Step 514 (NO in the Step 514), furthermore, the MCF signal is returned to the apparatus on the transmitting side in response to the post message (Step 515) and the processing proceeds to the Step 516.

At the Step 516, it is checked whether image information of a next page is received or not. If the image information of the next page is received (YES in the Step 516), the processing returns to the Step 501 and the processing for receiving the image information of the next page is executed, and the processing from the Step 501 to the Step 516 is repeated.

If it is decided that the image information of the next page is not received at the Step 516 (NO in the Step 516), moreover, it is then checked whether a DCN signal is received or not (Step 517). If it is decided that the DCN signal is not received (NO in the Step 517), the processing returns to the Step 516 in which it is checked whether the image information of the next page is received or not again. If it is decided that the DCN signal is received (YES in the Step 517), the processing is ended.

Fifth Example

In a fifth example, the T.38 IFP packet control portion 111 in FIG. 1 calculates a total number of received packets, a total number of loss packets and a maximum number of continuous loss packets in a receipt of image information. Moreover, the image communicating control portion 109 acquires the total number of received packets, the total number of loss packets and the maximum number of continuous loss packets from the T.38 IFP packet control portion 111, calculates a packet loss ratio Pe from a rate of the total number of loss packets to the total number of received packets, and furthermore, detects a number of transmission line errors from data obtained after decoding an IFP packet.

If the number of transmission line errors thus detected exceeds a threshold Y or if the number of transmission line errors thus detected is equal to or smaller than the threshold Y and the packet loss ratio Pe thus calculated exceeds the threshold C, a communication with an apparatus on a transmitting side is interrupted. If the number of transmission line errors exceeds a threshold X which is smaller than the threshold Y or if the number of transmission line errors is equal to or smaller than the threshold X and the packet loss ratio Pe exceeds the threshold A, an RTN signal is returned to the apparatus on the transmitting side in response to a post message. If the packet loss ratio Pe is equal to or smaller than the threshold A and a maximum number of continuous loss packets MNe exceeds a threshold "a", an RTP signal is returned to the apparatus on the transmitting side in response to the post message. If the packet loss ratio Pe is equal to or smaller than the threshold A and the maximum number of continuous loss packets MNe is equal to or smaller than the threshold "a", an MCF signal is returned to the apparatus on the transmitting side in response to the post message.

Figure 6:
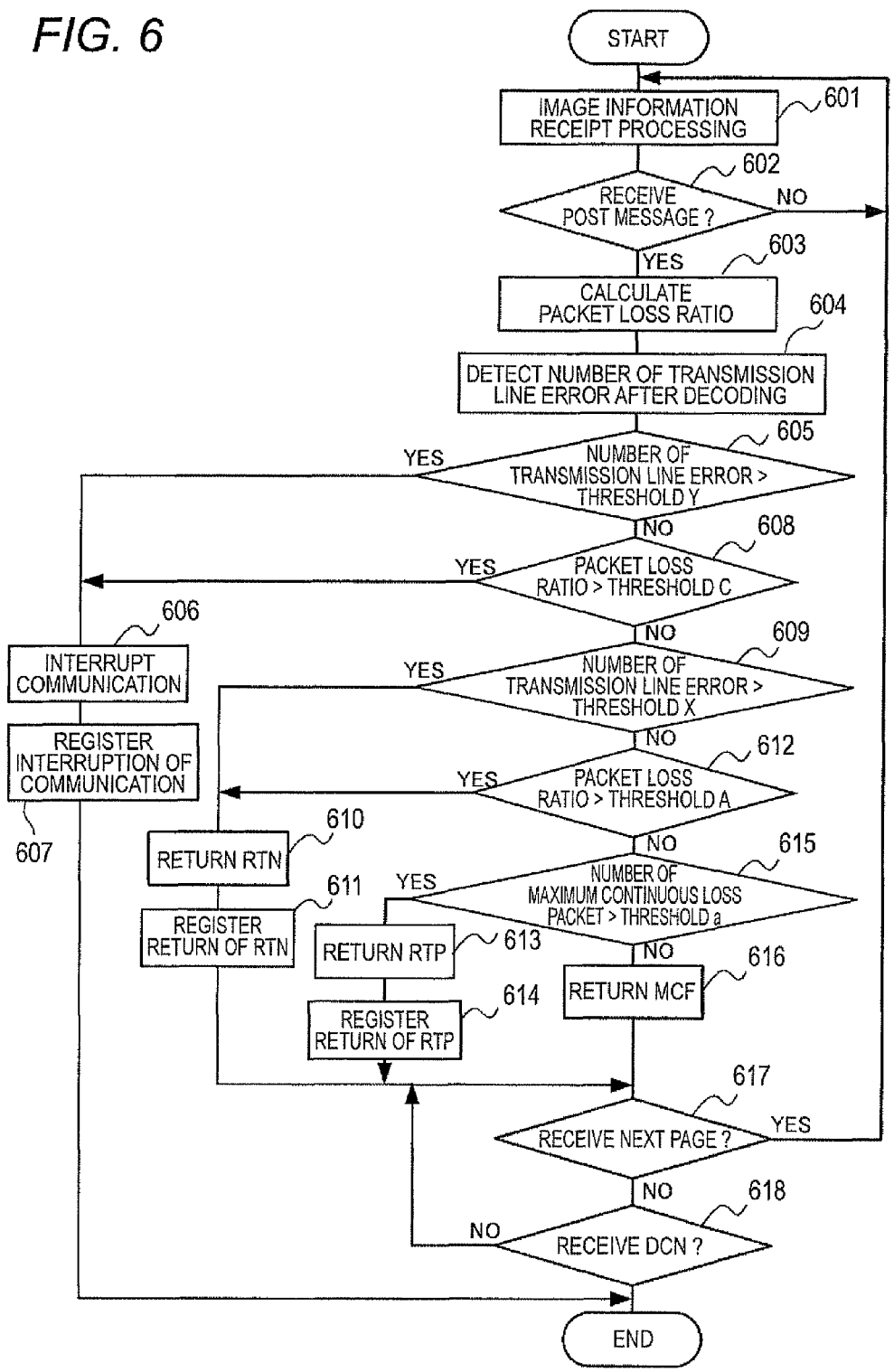
FIG. 6 is a flowchart showing the operation of the image communicating control portion illustrated in FIG. 1 according to a fifth example of the invention.

FIG. 6 is a flowchart showing an operation of the image communicating control portion illustrated in FIG. 1 according to the fifth example of the invention.

When a processing of the flowchart in FIG. 6 is started, it is checked whether a post message indicating an end of an image receipt processing (Step 601) is received or not (Step 602). If the post message is not received (NO in the Step 602), the processing returns to the Step 601 and the image receipt processing is continued to wait for the receipt of the post message. If it is decided that the post message is received (YES in the Step 602), a total number of received packets Nj and a total number of loss packets Ne in the receipt of the image information are acquired from the T.38 IFP packet control portion 111 and the packet loss ratio Pe is calculated (Step 603).

Moreover, a number of transmission line errors DNe is detected from the data obtained after decoding the IFP packet (Step 604). The number of transmission line errors DNe is detected by checking the number of dots between EOL codes of the data subjected to the decoding and deciding the line as a transmission error line to detect the number of transmission error lines if the number of dots is not coincident with the number of dots determined by TA recommended in ITU-T.

At Step 605, it is checked whether the number of transmission line errors DNe obtained after the decoding which is detected at the Step 604 exceeds the threshold Y or not, that is, DNe>Y is formed or not. If the number of transmission line errors obtained after the decoding exceeds the threshold Y (YES in the Step 605), the processing proceeds to Step 606.

If the number of transmission line errors DNe obtained after the decoding is equal to or smaller than the threshold Y (NO in the Step 605), furthermore, it is checked whether the packet loss ratio Pe calculated at the Step 603 exceeds the threshold C or not (Step 608). If the packet loss ratio Pe exceeds the threshold C, the processing proceeds to the Step 606.

At the Step 606, a communication with an apparatus on a transmitting side is interrupted. The interruption of the communication is registered as log information in the storing portion 106 (Step 607) and the processing is ended.

If it is decided that the packet loss ratio Pe is equal to or smaller than the threshold C at the Step 608 (NO in the Step 608), moreover, it is then checked whether the number of transmission line errors DNe which is detected exceeds the threshold X or not, that is, DNe>X is formed or not (Step 609). If the number of transmission line errors DNe which is obtained after the decoding exceeds the threshold X (YES in the Step 609), the processing proceeds to Step 610.

If the number of transmission line errors DNe which is detected is equal to or smaller than the threshold X (NO in the Step 609), furthermore, it is checked whether the packet loss ratio Pe exceeds the threshold A or not (Step 612). If the packet loss ratio Pe exceeds the threshold A (YES in the Step 612), the processing proceeds to the Step 610.

At the Step 610, the RTN signal is returned to the apparatus on the transmitting side in response to -a post message. The return of the RTN signal is registered as log information in the storing portion 106 (Step 611) and the processing proceeds to Step 617, If it is decided that the packet loss ratio Pe is equal to or smaller than the threshold A at the Step 612 (NO in the Step 612), moreover, it is checked whether the maximum number of continuous loss packets MNe exceeds the threshold "a" or not (Step 615). If the maximum number of continuous loss packets MNe exceeds the threshold "a" (YES in the Step 615), the processing proceeds to Step 613.

At the Step 613, the RTP signal is returned to the apparatus on the transmitting side in response to the post message. The return of the RTP signal is registered as log information in the storing portion 106 (Step 614) and the processing proceeds to Step 617.

If it is decided that the maximum number of continuous loss packets MNe is equal to or smaller than the threshold "a" at the Step 615 (NO in the Step 615), furthermore, the MCF signal is returned to the apparatus on the transmitting side in response to the post message (Step 616) and the processing proceeds to the Step 617.

At the Step 617, it is checked whether image information of a next page is received or not. If the image information of the next page is received (YES in the Step 617), the processing returns to the Step 601, and the processing for receiving the image information of the next page is carried out and the processing from the Step 601 to the Step 617 is repeated.

If it is decided that the image information of the next page is not received at the Step 617 (NO in the Step 617), moreover, it is then checked whether a DCN signal is received or not (Step 618). If it is decided that the DCN signal is not received (NO in the Step 618), the processing returns to the Step 617 in which it is checked whether the image information of the next page is received or not again. If it is decided that the DCN signal is received (YES in the Step 618), the processing is ended.

In the flowchart shown in FIG. 6, if it is decided that the packet loss ratio Pe is equal to or smaller than the threshold A at the Step 612 (NO in the Step 612) and if the maximum number of continuous loss packets MNe exceeds the threshold "a" (YES in the Step 615), the RTP signal is returned to the apparatus on the transmitting side in response to the post message and the return of the RTP signal is registered as log information in the storing portion 106 (Step 614). However, it is also possible to employ a structure in which a threshold Z which is smaller than the threshold X is further set corresponding to the number of transmission line errors DNe, a threshold B which is smaller than the threshold A is further set corresponding to the packet loss ratio Pe, a threshold "b" which is smaller than the threshold "a" is further set corresponding to the maximum number of continuous loss packets MNe, and a retraining positive signal is returned to the apparatus on the transmitting side in response to a post message if there is satisfied at least one of the case in which the number of transmission line errors DNe is equal to or smaller than the threshold X and exceeds the threshold Z, the case in which the packet loss ratio Pe is equal to or smaller than the threshold A and exceeds the threshold B and the case in which the maximum number of continuous loss packets MNe is equal to or smaller than the threshold X and exceeds the threshold Z.

Next, description will be given to a structure of a packet to be used in an image information transmission and a method of counting a total number of received packets, a total number of loss packets and a maximum number of continuous loss packets in a receipt of image information through the T.38 IFP packet control portion 111 according to the invention.

Figure 7:
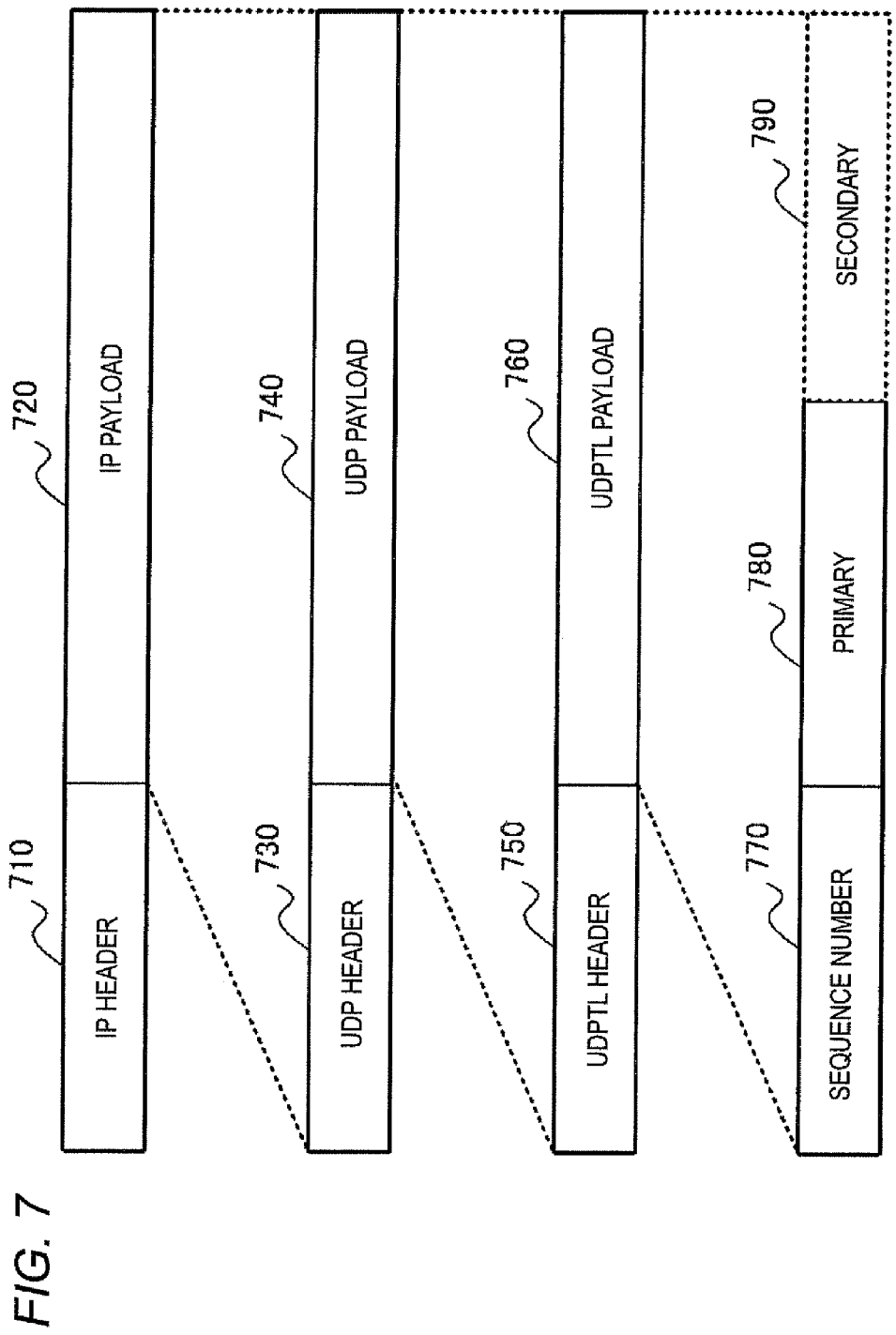
FIG. 7 is a diagram showing a structure of a packet to be used for an image information transmission according to the invention.

FIG. 7 is a diagram showing the structure of the packet to be used in the image information communication according to the invention.

The image information communication through T.38 according to the invention is carried out by an IP layer, a UDP layer and a UDPTL layer, and the structure of the packet shown in FIG. 7 is used in the image information communication. In other words, the packet is constituted by an IP header 710 and an IP payload 720, the IP payload 720 is constituted by a UDP header 730 and a UDP payload 740, the UDP payload 740 is constituted by a UDPTL header 750 and a UDPTL payload 760, and the UDPTL payload 760 is constituted by a sequence number 770, a primary portion 780 and a secondary portion 790.

Image information to be transmitted through the image communication according to the invention is contained in the primary portion 780, and the sequence number 770 is given to the primary portion 780. In the invention, the sequence number 770 is utilized to count the total number of received packets, the total number of loss packets and the maximum number of continuous loss packets in the IFP packet in the receipt of the image information.

Figure 8:
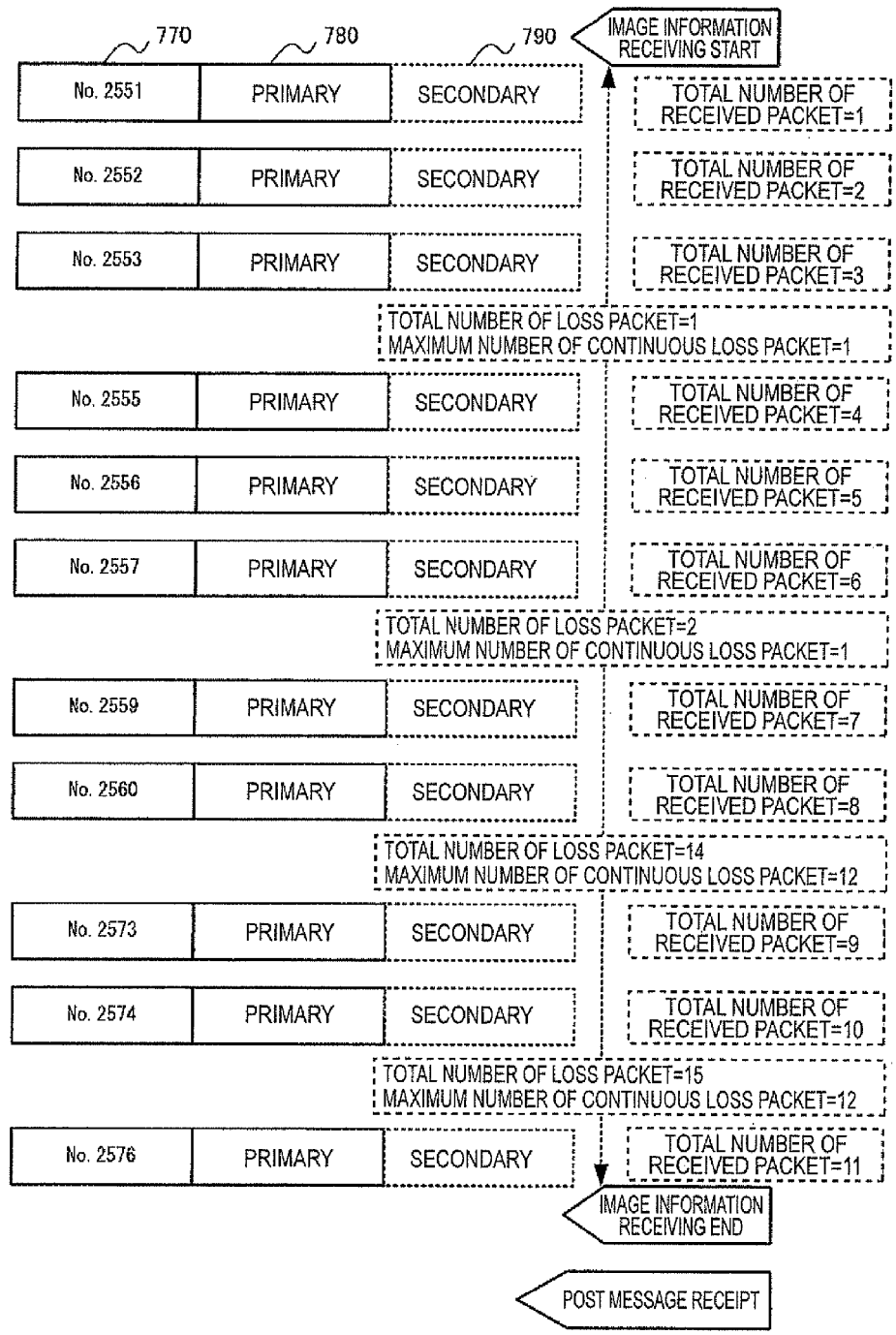
FIG. 8 is an explanatory diagram showing an operation, illustrating an example of an operation for counting a total number of received packets, a total number of loss packets and a maximum number of continuous loss packets according to the invention.

FIG. 8 is an explanatory diagram showing an example of an operation for counting the total number of received packets, the total number of loss packets and the maximum number of continuous loss packets which utilize the sequence number 770 according to the invention.

FIG. 8 typically shows an example of a flow of the primary portion 780 from an image information receiving start to an image information receiving end. After the image information receiving start (801), first of all, the primary portions 780 having sequence numbers "No. 2551", "No. 2552" and "No. 2553" are received. In this case, the total number of received packets is increased in order of "1", "2" and "3" corresponding to the sequence numbers "No. 2551", "No. 2552" and "No. 2553".

Next, the primary portion 780 having a sequence number "No. 2554" is missing. Therefore, the total number of loss packets is "1" and the maximum number of continuous loss packets is "1".

Then, the primary portions 780 having sequence numbers "No. 2555", "No. 2556" and "No. 2557" are received, and thereafter, the primary portion 780 having a sequence number "No. 2558" is missing.

In this case, the total number of received packets is increased in order of "4", "5" and "6" corresponding to the sequence numbers "No. 2555", "No. 2556" and "No. 2557", and the total number of loss packets is "2" and the maximum number of continuous loss packets is maintained to be "1".

Subsequently, the primary portions 780 having sequence numbers "No. 2559" and "No. 2560" are received, and then, twelve primary portions 780 having sequence numbers "No. 2561" to "2572" are missing.

Consequently, the total number of received packets is increased in order of "7" and "8" corresponding to the sequence numbers "No. 2559" and "No. 2560", and the total number of loss packets is "14" and the maximum number of continuous loss packets is "12".

Next, the primary portions 780 having sequence numbers "No. 2573" and "No. 2574" are received, and thereafter, the primary portion 780 having a sequence number "No. 2575" is missing.

In this case, the total number of received packets is increased in order of "9" and "10" corresponding to the sequence numbers "No. 2573" and "No. 2574", and the total number of loss packets is "15" and the maximum number of continuous loss packets is maintained to be "12".

Subsequently, the primary portion 780 having a sequence number "No. 2576" is received and the total number of received packets is changed to be "11" corresponding to the sequence number "No. 2576" so that the image information receiving end (802) is carried out.

As a result, when a post message is received (803), the total number of received packets, the total number of loss packets and the maximum number of continuous loss packets are counted as "11", "15" and "12", respectively.

Figure 9:
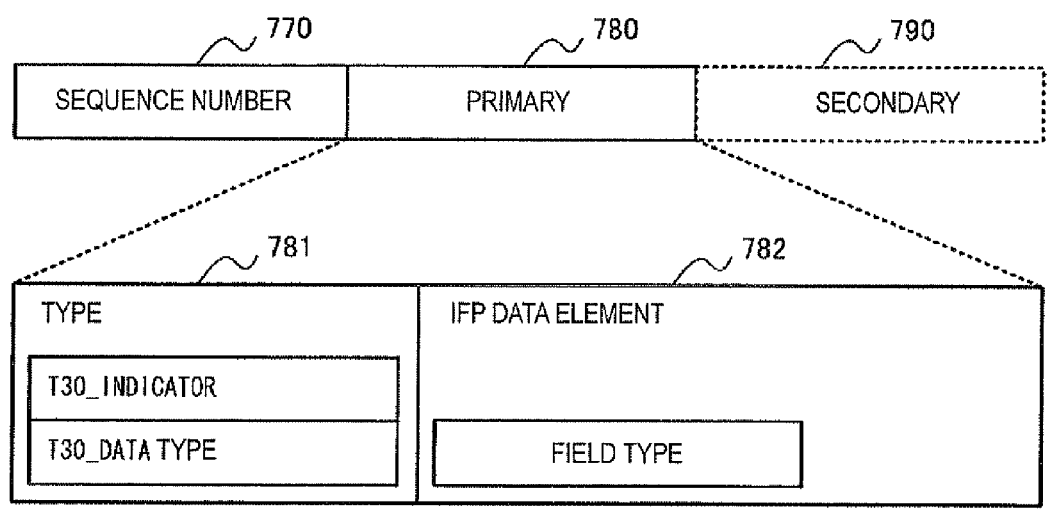
FIG. 9 is a diagram showing a structure of a packet, illustrating the details of the packet to be used in the invention.

FIG. 9 is a diagram showing a structure of a packet, illustrating a detailed structure of the primary portion 780.

As shown in FIG. 9, the primary portion 780 is constituted by a type portion 781 and an IFP data element portion 782 and forms an IFP packet. The type portion 781 indicates a type of the IFP packet and includes information such as "T30_INDICATOR" or "T30_DATA type". Moreover, the IFP data element portion 782 includes information such as a "field type".

Figure 10:
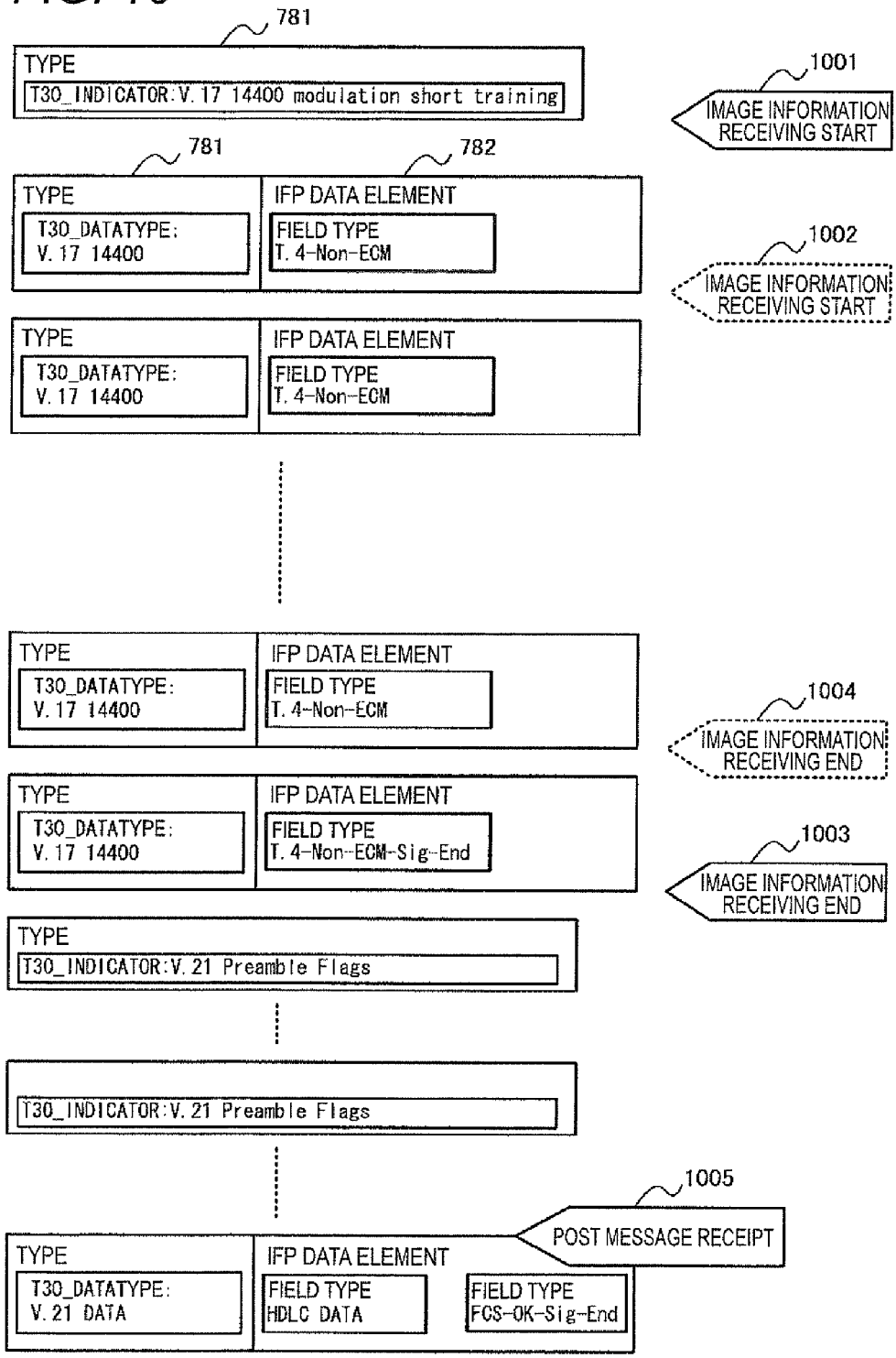
FIG. 10 is a diagram for explaining an operation for detecting an image information receiving start and an image information receiving end to count the total number of received packets, the total number of loss packets and the maximum number of continuous loss packets according to the invention.

FIG. 10 is a diagram for explaining an operation for detecting an image information receiving start and an image information receiving end for counting a total number of received packets, a total number of loss packets and a maximum number of continuous loss packets according to the invention.

As shown in FIG. 10, in a non-ECM image information communication through T.38, image information is received by receiving an IFP packet including "T.4-Non-ECM" in the IFP data element portion 782 which is to be received after receiving an IFP packet including "T30_INDICATOR: V.17 14400 modulation short training" in the type portion 781 in a phase C, for example, and a post message 1005 is received after the image information receiving end.

In an example according to the invention, in principle, when T30 INDICATOR preceding T30 DATA including phase C data is received, for example, an IFP packet including "T30_INDICATOR: V.17 14400 modulation short training" in the type portion 781 is received, this time (1001) is detected as an image information receiving start.

In the case in which the IFP packet including the "T30_INDICATOR" in the type portion 781 cannot be received for some reason, however, a time (1002) that the IFP packet including the "T.4-Non-ECM" in the IFP data element portion 782 is first received is detected as the image information receiving start.

In the case in which an IFP packet including "T.4-Non-ECM-Sig-END" in the field type of the IFP data element 782 is received, in principle, a time (1003) is detected as the image information receiving end.

In the case in which the IFP packet including the "T.4-Non-ECM-Sig-END" in the field type of the IFP data element 782 cannot be received but "T30_INDICATOR: V21 preamble Flags" preceding the post message is received for some reason, however, a time (1004) that the IFP packet having the field type "T.4-Non-ECM" is received finally by going back to a previous part thereto is detected as the image information receiving end.

Figure 11:
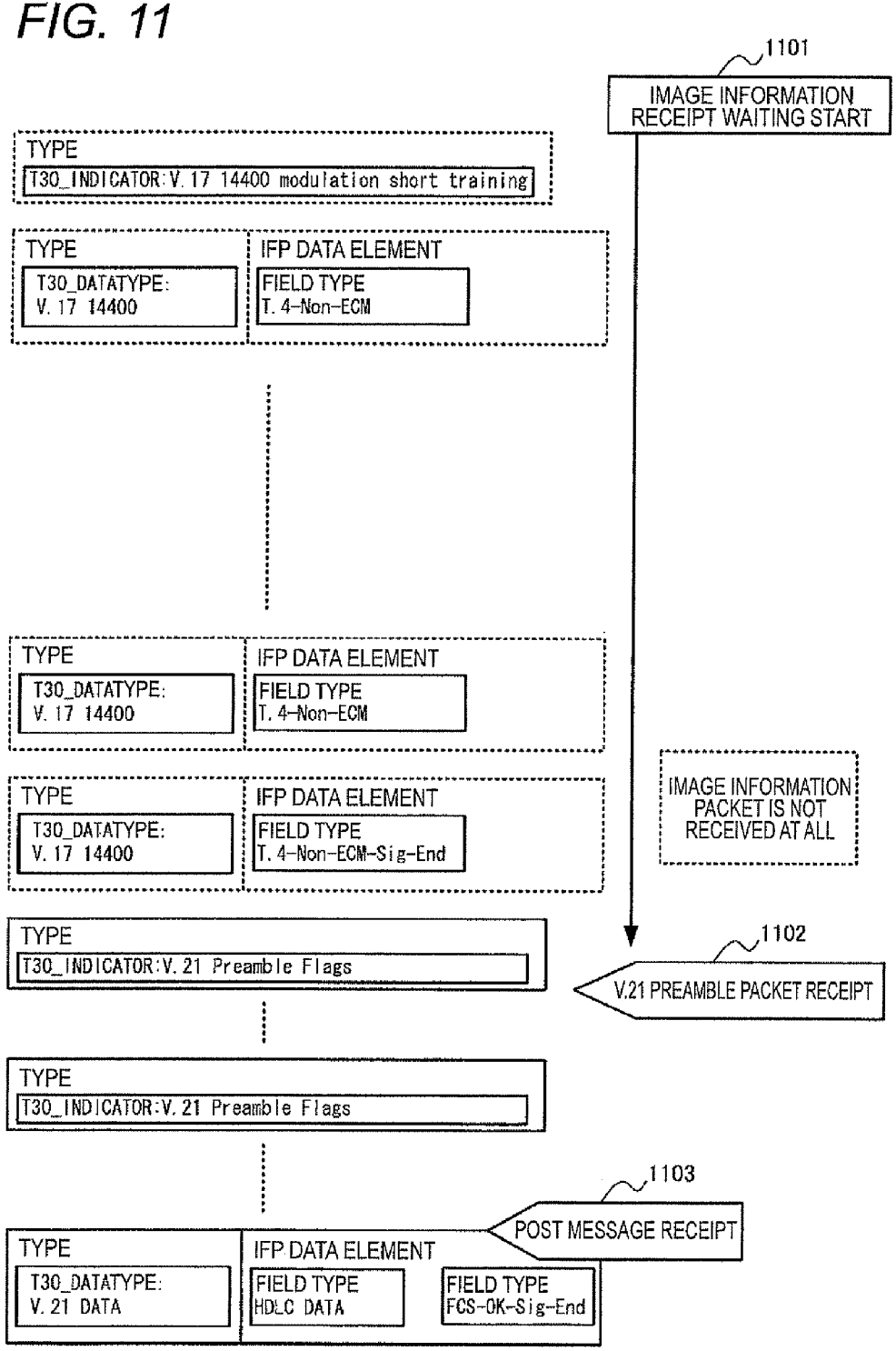
FIG. 11 is a diagram for explaining an operation in the case in which the image information receiving start cannot be detected but an image receipt is ended according to the invention.

FIG. 11 is a diagram for explaining an operation in the case in which the image information receiving start cannot be detected but the image information receipt is ended according to the invention.

In the case in which an image information receipt waiting state is started (1101) and the image information receiving start is not detected but the image information receipt is ended in the phase C, that is, the case in which a packet which can be decided to be the image information receiving start is not received but a V.21 Preamble packet is received, more specifically, the type "T30_INDICATOR: Preamble Flags" of the type portion 781 is received (1102), the total number of packets is set to be zero.

In this case, the RTN signal is returned to the apparatus on the transmitting side in response to a post message receipt (1103) or a communication with the apparatus on the transmitting side is interrupted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image communicating apparatus comprising:
a main control portion;
a storing portion storing instructions which when executed cause the main control portion to act as:
  a packet control portion that transmits/receives an Internet Facsimile Protocol packet by a T.38 communicating function; and
  an image communicating control portion that describes a T.30 command and image information in a field of the Internet Facsimile Protocol packet to control an image communication,
the packet control portion including:
  a counting unit that counts a total number of received packets and a number of loss packets in the Internet Facsimile Protocol packet in a receipt of the image information, and
the image communicating control portion including:
  a calculating unit that calculates a loss ratio of the Internet Facsimile Protocol packet in the receipt of the image information from a rate of the number of loss packets to the total number of received packets which is counted by the counting unit in a receipt of a post message; and
  a response signal returning unit that returns a retraining negative signal to an apparatus on a transmitting side for the image information in response to the post message if the loss ratio calculated by the calculating unit exceeds a first threshold, and returns a message confirming signal to the apparatus on the transmitting side in response to the post message if the loss ratio calculated by the calculating unit is equal to or smaller than the first threshold; and
  a communication interrupting unit that interrupts a communication if the loss ratio calculated by the calculating unit exceeds a second threshold which is greater than the first threshold.

2. The image communicating apparatus according to claim 1, wherein the Internet Facsimile Protocol packet is transmitted from the apparatus on the transmitting side with continuous numbers given thereto, and
the counting unit counts the total number of received packets from a number of receipts of the Internet Facsimile Protocol packet to which the continuous numbers are given and counts the number of loss packets from a missing number in the continuous numbers.

3. The image communicating apparatus according to claim 1, wherein the counting unit detects, as an image information receiving start, a time that T30 INDICATOR preceding T30 DATA including phase C data is received or a time that a packet in which a field type of an Internet Facsimile Protocol data element is T.4-Non-ECM is received if the T30 INDICATOR is not received, detects, as an image information receiving end, a time that a packet in which the field type of the Internet Facsimile Protocol data element is T.4-Non-ECM-Sig-END is received or a time that a packet in which the field type of the Internet Facsimile Protocol data element is T.4-Non-ECM is finally received by going back through a receipt of T30 INDICATOR: V.21 Preamble Flags preceding a post message if the packet in which the field type of the Internet Facsimile Protocol data element is T.4-Non-ECM-Sig-END is not received, and counts the total number of received packets and the number of loss packets from the detection of the image information receiving start to the detection of the image information receiving end.

4. The image communicating apparatus according to claim 3, wherein
the counting unit sets a count value of the total number of received packets to be zero if the image information receiving start is not detected but the image information receipt is ended, and
the image communicating control portion returns a retraining negative signal to the apparatus on the transmitting side for the image information or interrupts a communication if the count value of the total number of received packets is set to be zero.

5. An image communicating apparatus comprising:
a main control portion;
a storing portion storing instructions which when executed cause the main control portion to act as:
a packet control portion that transmits/receives an Internet Facsimile Protocol packet by a T.38 communicating function; and
an image communicating control portion that describes a T.30 command and image information in a field of the Internet Facsimile Protocol packet to control an image communication,
the packet control portion including:
a counting unit that counts a total number of received packets and a number of loss packets in the Internet Facsimile Protocol packet in a receipt of the image information, and
the image communicating control portion including:
a calculating unit that calculates a loss ratio of the Internet Facsimile Protocol packet in the receipt of the image information from a rate of the number of loss packets to the total number of received packets which is counted by the counting unit in a receipt of a post message; and
a response signal returning unit that returns a retraining negative signal to an apparatus on a transmitting side for the image information in response to the post message if the loss ratio calculated by the calculating unit exceeds a first threshold, returns a retraining positive signal to the apparatus on the transmitting side in response to the post message if the loss ratio is equal to or smaller than the first threshold and exceeds a second threshold which is smaller than the first threshold, and returns a message confirming signal to the apparatus on the transmitting side in response to the post message if the loss ratio is equal to or smaller than the second threshold; and
a communication interrupting unit that interrupts a communication if the loss ratio calculated by the calculating unit exceeds a third threshold which is greater than the first threshold.

6. An image communicating apparatus comprising:
a main control portion;
a storing portion storing instructions which when executed cause the main control portion to act as:
a packet control portion that transmits/receives an Internet Facsimile Protocol packet by a T.38 communicating function; and
an image communicating control portion that describes a T.30 command and image information in a field of the Internet Facsimile Protocol packet to control an image communication,
the packet control portion including:
a counting unit that counts a maximum number of continuous loss packets in the Internet Facsimile Protocol packet in a receipt of the image information, and
the image communicating control portion including:
a response signal returning unit that returns a retraining negative signal to an apparatus on a transmitting side for the image information in response to a post message if the maximum number of continuous loss packets counted by the counting unit exceeds a first threshold, and returns a message confirming signal to the apparatus on the transmitting side in response to the post message if the maximum number of continuous loss packets counted by the counting unit is equal to or smaller than the first threshold in a receipt of the post message, wherein
the Internet Facsimile Protocol packet is transmitted from the apparatus on the transmitting side with continuous numbers given thereto, and
the counting unit counts the maximum number of continuous loss packets by counting a continuous number of missing numbers in the continuous numbers.

7. The image communicating apparatus according to claim 6, wherein the counting unit detects, as an image information receiving start, a time that T30 INDICATOR preceding T30 DATA including phase C data is received or a time that a packet in which a field type of an Internet Facsimile Protocol data element is T.4-Non-ECM is received if the T30 INDICATOR is not received, detects, as an image information receiving end, a time that a packet in which the field type of the Internet Facsimile Protocol data element is T.4-Non-ECM-Sig-END is received or a time that a packet in which the field type of the Internet Facsimile Protocol data element is T.4-Non-ECM is finally received by going back through a receipt of T30 INDICATOR: V.21 Preamble Flags preceding a post message if the packet in which the field type of the Internet Facsimile Protocol data element is T.4-Non-ECM-Sig-END is not received, and counts the maximum number of continuous loss packets from the detection of the image information receiving start to the detection of the image information receiving end.

8. An image communicating apparatus comprising:
a main control portion;
a storing portion storing instructions which when executed cause the main control portion to act as:
a packet control portion that transmits/receives an Internet Facsimile Protocol packet by a T.38 communicating function; and
an image communicating control portion that describes a T.30 command and image information in a field of the Internet Facsimile Protocol packet to control an image communication,
the packet control portion including:
a counting unit that counts a maximum number of continuous loss packets in the Internet Facsimile Protocol packet in a receipt of the image information, and
the image communicating control portion including:
a response signal returning unit that returns a retraining negative signal to an apparatus on a transmitting side for the image information in response to a post message if the maximum number of continuous loss packets counted by the counting unit exceeds a first threshold, returns a retraining positive signal to the apparatus on the transmitting side in response to the post message if the maximum number of continuous loss packets is equal to or smaller than the first threshold and exceeds a second threshold which is smaller than the first threshold, and returns a message confirming signal to the apparatus on the transmitting side in response to the post message if the maximum number of continuous loss packets is equal to or smaller than the second threshold in a receipt of the post message, wherein the Internet Facsimile Protocol packet is transmitted from the apparatus on the transmitting side with continuous numbers given thereto, and the counting unit counts the maximum number of continuous loss packets by counting a continuous number of missing numbers in the continuous numbers.

9. An image communicating apparatus comprising:

a main control portion;

a storing portion storing instructions which when executed cause the main control portion to act as:

- a packet control portion that transmits/receives an Internet Facsimile Protocol packet by a T.38 communicating function; and
- an image communicating control portion that describes a T.30 command and image information in a field of the Internet Facsimile Protocol packet to control an image communication, the packet control portion including:

- a counting unit that counts a total number of received packets, a number of loss packets and a maximum number of continuous loss packets in the Internet Facsimile Protocol packet in a receipt of the image information, and the image communicating control portion including:

- a calculating unit that calculates a loss ratio of the Internet Facsimile Protocol packet in the receipt of the image information from a rate of the number of loss packets to the total number of received packets which is counted by the counting unit; and
- a response signal returning unit that returns a retraining negative signal to an apparatus on a transmitting side for the image information in response to the post message if the loss ratio calculated by the calculating unit exceeds a first threshold of the loss ratio or if the maximum number of continuous loss packets counted by the counting unit exceeds a first threshold of the maximum number of continuous loss packets, and returns a message confirming signal to the apparatus on the transmitting side in response to the post message if the loss ratio calculated by the calculating unit is equal to or smaller than the first threshold of the loss ratio and the maximum number of continuous loss packets counted by the counting unit is equal to or smaller than the first threshold of the maximum number of continuous loss packets; and
- a communication interrupting unit that interrupts a communication if the loss ratio calculated by the calculating unit exceeds a second threshold which is greater than the first threshold.

10. An image communicating apparatus comprising:

a main control portion;

a storing portion storing instructions which when executed cause the main control portion to act as:

- a packet control portion that transmits/receives an Internet Facsimile Protocol packet by a T.38 communicating function; and
- an image communicating control portion that describes a T.30 command and image information in a field of the Internet Facsimile Protocol packet to control an image communication, the packet control portion including:

- a counting unit that counts a total number of received packets, a number of loss packets and a maximum number of continuous loss packets in the Internet Facsimile Protocol packet in a receipt of the image information, and the image communicating control portion including:

- a calculating unit that calculates a loss ratio of the Internet Facsimile Protocol packet in the receipt of the image information from a rate of the number of loss packets to the total number of received packets which is counted by the counting unit in a receipt of a post message; and
- a response signal returning unit that returns a retraining negative signal to an apparatus on a transmitting side for the image information in response to the post message if the loss ratio calculated by the calculating unit exceeds a first threshold of the loss ratio or if the maximum number of continuous loss packets counted by the counting unit exceeds a first threshold of the maximum number of continuous loss packets, returns a retraining positive signal to the apparatus on the transmitting side in response to the post message if the loss ratio is equal to or smaller than the first threshold of the loss ratio and exceeds a second threshold of the loss ratio which is smaller than the first threshold of the loss ratio or if the maximum number of continuous loss packets is equal to or smaller than the first threshold of the maximum number of continuous loss packets and exceeds a second threshold of the maximum number of continuous loss packets which is smaller than the first threshold of the maximum number of continuous loss packets, and returns a message confirming signal to the apparatus on the transmitting side in response to the post message if the loss ratio is equal to or smaller than the second threshold of the loss ratio and the maximum number of continuous loss packets is equal to or smaller than the second threshold of the maximum number of continuous loss packets; and
- a communication interrupting unit that interrupts a communication if the loss ratio calculated by the calculating unit exceeds a third threshold which is greater than the first threshold.

11. An image communicating apparatus comprising:

a main control portion;

a storing portion storing instructions which when executed cause the main control portion to act as:

- a packet control portion that transmits/receives an Internet Facsimile Protocol packet by a T.38 communicating function; and
- an image communicating control portion that describes a T.30 command and image information in a field of the Internet Facsimile Protocol packet to control an image communication, the packet control portion including:

- a counting unit that counts a total number of received packets, a number of loss packets and a maximum number of continuous loss packets in the Internet Facsimile Protocol packet in a receipt of the image information, and the image communicating control portion including:

- a calculating unit that calculates a loss ratio of the Internet Facsimile Protocol packet in the receipt of the image information from a rate of the number of loss packets to the total number of received packets which is counted by the counting unit;
- a detecting unit that detects a number of transmission line errors obtained after decoding the Internet Facsimile Protocol packet; and a response signal returning unit that returns a retraining negative signal to an apparatus on a transmitting side for the image information in response to the post message if the number of transmission line errors detected by the detecting unit exceeds a first threshold of the number of transmission line errors, if the loss ratio calculated by the calculating unit exceeds a first threshold of the loss ratio or if the maximum number of continuous loss packets counted by the counting unit exceeds a first threshold of the maximum number of continuous loss packets, and returns a message confirming signal to the apparatus on the transmitting side in response to the post message if the number of transmission line errors detected by the detecting unit is equal to or smaller than the first threshold of the number of transmission line errors, the loss ratio calculated by the calculating unit is equal to or smaller than the first threshold of the loss ratio, and the maximum number of continuous loss packets counted by the counting unit is equal to or smaller than the first threshold of the maximum number of continuous loss packets.

12. The image communicating apparatus according to claim 11, wherein the response signal returning unit returns a retraining positive signal to the apparatus on the transmitting side in response to the post message when there is satisfied the case in which the retraining negative signal is not returned to the apparatus on the transmitting side for the image information in response to the post message, that is, at least one of the case in which the number of transmission line errors is equal to or smaller than the first threshold of the number of transmission line errors and exceeds a second threshold of the number of transmission line errors which is smaller than the first threshold of the number of transmission line errors, the case in which the loss ratio is equal to or smaller than the first threshold of the loss ratio and exceeds a second threshold of the loss ratio which is smaller than the first threshold of the loss ratio, and the case in which the maximum number of continuous loss packets is equal to or smaller than the first threshold of the maximum number of continuous loss packets and exceeds a second threshold of the maximum number of continuous loss packets.

13. The image communicating apparatus according to claim 11 further comprising
a communication interrupting unit that interrupts a communication if the number of transmission line errors detected by the detecting unit exceeds a third threshold of the number of transmission line errors which is greater than the first threshold of the number of transmission line errors or if the loss ratio calculated by the calculating unit exceeds a third threshold which is greater than the first threshold.

* * * * *